United States Patent
Cook (10) Patent No.: US 7,880,320 B2
(45) Date of Patent: Feb. 1, 2011

(54) SYSTEM, DEVICE, AND METHOD FOR CONTROLLING A WIND TURBINE USING SEASONAL PARAMETERS

(75) Inventor: Mark Lee Cook, Tehachapi, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/609,237

(22) Filed: Oct. 30, 2009

(65) Prior Publication Data

US 2010/0140938 A1    Jun. 10, 2010

(51) Int. Cl.
*F03D 9/00* (2006.01)
*H02P 9/04* (2006.01)

(52) U.S. Cl. .......................... 290/44; 290/55

(58) Field of Classification Search .................. 290/44, 290/55

See application file for complete search history.

(56) References Cited

U.S. PATENT DOCUMENTS

| | | | | |
|---|---|---|---|---|
| 4,123,796 | A * | 10/1978 | Shih | 700/278 |
| 5,394,748 | A * | 3/1995 | McCarthy | 73/291 |
| 6,489,691 | B1 * | 12/2002 | Lang | 290/44 |
| 6,492,743 | B1 * | 12/2002 | Appa | 290/55 |
| 7,184,745 | B2 * | 2/2007 | Ballantyne et al. | 455/404.2 |
| 7,471,010 | B1 * | 12/2008 | Fingersh | 290/55 |
| 7,555,897 | B2 * | 7/2009 | Alekseevich et al. | 60/398 |
| 7,629,592 | B2 * | 12/2009 | VerMeulen et al. | 250/474.1 |
| 2003/0006614 | A1 * | 1/2003 | Appa | 290/55 |
| 2006/0159550 | A1 * | 7/2006 | Nagao | 416/132 B |
| 2007/0031237 | A1 * | 2/2007 | Bonnet | 415/1 |
| 2008/0110187 | A1 * | 5/2008 | Han et al. | 62/159 |
| 2008/0172275 | A1 * | 7/2008 | Ramanujan et al. | 705/8 |
| 2008/0172286 | A1 * | 7/2008 | Ramanujan et al. | 705/10 |
| 2008/0195255 | A1 | 8/2008 | Lutze et al. | 700/291 |
| 2008/0258078 | A1 * | 10/2008 | VerMeulen et al. | 250/474.1 |
| 2008/0270014 | A1 * | 10/2008 | Nagase et al. | 701/118 |
| 2009/0094981 | A1 * | 4/2009 | Eggleston | 60/641.2 |
| 2009/0106647 | A1 * | 4/2009 | Wilson et al. | 715/243 |
| 2009/0146423 | A1 * | 6/2009 | Arinaga | 290/44 |
| 2009/0212575 | A1 * | 8/2009 | Larsen et al. | 290/55 |
| 2009/0250192 | A1 * | 10/2009 | Garver | 165/45 |
| 2010/0008776 | A1 * | 1/2010 | Larsen et al. | 416/39 |

(Continued)

FOREIGN PATENT DOCUMENTS

EP    1918581 A2    5/2008

OTHER PUBLICATIONS

Todd J. Schram, Energy Production Potential of Wind Resources in Texas, Dec. 4, 1998, 19 pgs., US.

(Continued)

*Primary Examiner*—T C Patel
*Assistant Examiner*—Pedro J Cuevas
(74) *Attorney, Agent, or Firm*—Patrick W. Rasche, Esq.; Armstrong Teasdale LLP (57) ABSTRACT

A method for controlling an operation of a wind turbine. A plurality of operating specifications, each of which corresponds to a season, is defined. A current season is determined. An operating specification corresponding to the current season is selected. An operation of a wind turbine is controlled based at least in part on the selected operating specification. The current season may be determined, for example, based on a schedule of seasons and/or meteorological conditions.

20 Claims, 4 Drawing Sheets

U.S. PATENT DOCUMENTS

| | | | |
|---|---|---|---|
| 2010/0090464 A1* | 4/2010 | Egedal | 290/44 |
| 2010/0095617 A1* | 4/2010 | Scholte-Wassink | 52/296 |
| 2010/0133822 A1* | 6/2010 | Mixter, Jr. | 290/44 |
| 2010/0219636 A1* | 9/2010 | Arinaga | 290/44 |

OTHER PUBLICATIONS

Elisabeth Rareshide et al., "Podium presentation at the AWEA WINDPOWER Conference," Effects of Complex Wind regimes on Turbine Performance, May 2009, 15 pgs., Chicago, US.

E. Kavak Akpinar et al., "An Assessment on Seasonal Analysis of Wind Energy Characteristics and Wind Turbine Characteristics," Energy Conversion and Management, 2005, pp. 1848-1867, vol. 46, Elsevier.

D. Weisser et al., "Implications Of Seasonal And Diurnal Variations Of Wind Velocity For Power Output Estimation Of A Turbine: A Case Study Of Grenada," International Journal Of Energy Research, 2003, pp. 1165-1179, vol. 27, New York.

* cited by examiner

SYSTEM, DEVICE, AND METHOD FOR CONTROLLING A WIND TURBINE USING SEASONAL PARAMETERS

BACKGROUND OF THE INVENTION

The subject matter described herein relates generally to operating a wind turbine and, more particularly, to applying seasonal adjustments to operating parameters for a wind turbine.

A wind farm includes one or more wind turbines, which utilize wind energy to generate or produce electrical power. Known wind turbines include a control system for operating the wind turbine in a safe and efficient manner. Operating parameters are used to define the behavior of the wind turbine. For example, a controller of a wind turbine may recognize a fault condition if an internal temperature of the wind turbine exceeds a threshold value, and, in response, disable the wind turbine.

Disabling a wind turbine eliminates all power production from the wind turbine until it is enabled again. Efficient operation of a wind farm requires maximizing the amount of time wind turbines operate in safe conditions while avoiding operating wind turbines in potentially damaging conditions. Due to seasonal climate variation, distinguishing normal or safe operating conditions from dangerous operating conditions with a single set of operating parameters can be difficult.

BRIEF DESCRIPTION OF THE INVENTION

In one aspect, a system for controlling an operation of a wind turbine is provided. The system includes a wind turbine controller. The wind turbine controller is configured to control an operation of the wind turbine. The system also includes a seasonal operation controller, which includes a memory area for storing a plurality of operating specifications. Each operating specification of the plurality of operating specifications is associated with a season. The seasonal operation controller also includes a processor that is programmed to determine a current season and select, from the operating specifications in the memory area, an operating specification associated with the current season. The seasonal operation controller further includes a communication interface that is communicatively coupled to the wind turbine controller and configured to transmit the selected operating specification to the wind turbine controller. The wind turbine controller controls the operation of the wind turbine based at least in part on the transmitted operating specification.

In another aspect, a device for controlling an operation of a wind turbine is provided. The device includes a memory area for storing a plurality of operating specifications. Each operating specification of the plurality of operating specifications corresponds to a season. The device also includes a processor programmed to determine a current season and select, from the plurality of operating specifications in the memory area, an operating specification corresponding to the current season. The device further includes a wind turbine control interface configured to control an operation of a wind turbine based at least in part on the selected operating specification.

In yet another aspect, a method for controlling a wind turbine is provided. The method includes defining a plurality of operating specifications in a memory area of a computing device. Each operating specification of the plurality of operating specifications is associated with a plurality of operating parameter definitions and corresponds to a season. A current season is determined by the computing device. An operation specification of the plurality of operating specifications corresponding to the current season is selected from the memory area. An operation of a wind turbine is controlled based at least in part on the plurality of operating parameter definitions associated with the selected operating specification.

DETAILED DESCRIPTION OF THE INVENTION

The embodiments described herein facilitate operation of one or more wind turbines using seasonally adjusted operating parameters associated with a season-specific operating specification. In one embodiment, one or more season-specific operating specifications are defined. A controller selects an operating specification for the current season, and the wind turbine is operated according to operating parameters associated with the operating specification.

Some embodiments described involve a determination of a current season from among two or more seasons. A season is any period of time exhibiting or predicted to exhibit one or more meteorological conditions (e.g., air temperature, wind speed, wind direction, and/or precipitation rate) with relative consistency. In some geographic areas, seasons may be defined primarily based on air temperature. For example, if two seasons are defined, a first season may be a cold season, and a second season may be a warm season. Three seasons may be defined by adding a transitional season, which may occur between the cold season and the warm season and/or between the warm season and the cold season. Seasons may, but need not, coincide with traditional calendar seasons (i.e., winter, spring, summer, and fall). In some geographic areas, seasons may additionally or alternatively be defined based on one or more meteorological conditions other than air temperature, such as precipitation rate. Any number of seasons suitable for operation of a wind turbine may be defined.

Embodiments described herein describe the use of operating specifications in controlling a wind turbine. An operating specification, as used herein, refers to an indicator of how a wind turbine is to be operated. A simple operating specification, for example, may include only an identifier of a parameter set. For example, a parameter set identifier may be a name of a parameter set, such as "cold weather preset." A wind turbine controller receiving a parameter set identifier may be programmed to select a parameter set having an identifier equal to the received parameter set identifier and control the wind turbine based on the selected parameter set.

A parameter set includes one or more operating parameter definitions and may be associated with a parameter set identifier. An operating parameter definition includes an operating parameter type and a parameter value. An operating parameter type may include, without limitation, an alarm threshold, a fault threshold, a device actuation threshold, a control setpoint, and/or a calculation algorithm identifier. A device actuation threshold is used to actuate a controllable device, such as a heating element, a ventilation system, and/or an active blade de-icing mechanism. A parameter value is expressed in terms appropriate for the corresponding operating parameter type. For example, a parameter value for a gearbox overheat fault threshold may be expressed as a temperature, in degrees Fahrenheit (° F.) or Celsius (° C.).

Defining parameter values for each season facilitates reducing "false" faults in a wind turbine. For example, an overheat fault threshold value of 180° F. for an internal component may be desirable in winter. However, if the ambient air temperature reaches 100° F. during summer, the overheat fault threshold value may be exceeded even in the absence of an operational issue. Adjusting the overheat fault threshold value enables increased use of the wind turbine.

In another example, a pressure threshold value is defined for an oil filter pressure sensor. If a pressure value transmitted by the sensor exceeds the pressure threshold value, a controller indicates that replacement of the oil filter is required. In cold weather, the viscosity of the oil increases, raising the pressure value transmitted by the sensor. During a cold season, therefore, a higher pressure threshold value than that used during a warm season may be desired.

In addition to, or instead of, a threshold value, a parameter value may include a calculation algorithm identifier. For example, a controller may store a plurality of calculation algorithms, each associated with an identifier. A calculation algorithm may be structured to return a Boolean result (i.e., true or false) or to return a numeric result. If the calculation algorithm returns a numeric result, the parameter value may include both a calculation algorithm identifier and a threshold value against which the numeric result from the corresponding calculation algorithm is compared. Other calculation algorithm result types are also contemplated.

An operating specification corresponding to a season may include or be associated with operating parameter definitions for a subset of the total operating parameter definitions available for a wind turbine. In some embodiments, default operating parameter definitions are defined for a wind turbine. Applying an operating specification overrides any default operating parameter definition corresponding to an operating parameter definition associated with the operating specification. If no season can be determined, the default operating parameter definitions may be used. Such embodiments facilitate modifying some operating parameters on a seasonal basis while leaving other operating parameters unchanged.

An exemplary technical effect of the methods, system, and apparatus described herein includes at least one of: (a) defining operating specifications, each corresponding to a season; (b) determining a current season, (c) selecting an operating specification corresponding to the current season; and (d) controlling an operation of a wind turbine based on the selected operating specification. As used herein, the term wind turbine is intended to be representative of any device that generates rotational energy from wind energy and, more specifically, converts kinetic energy of wind into mechanical energy.

Figure 1:
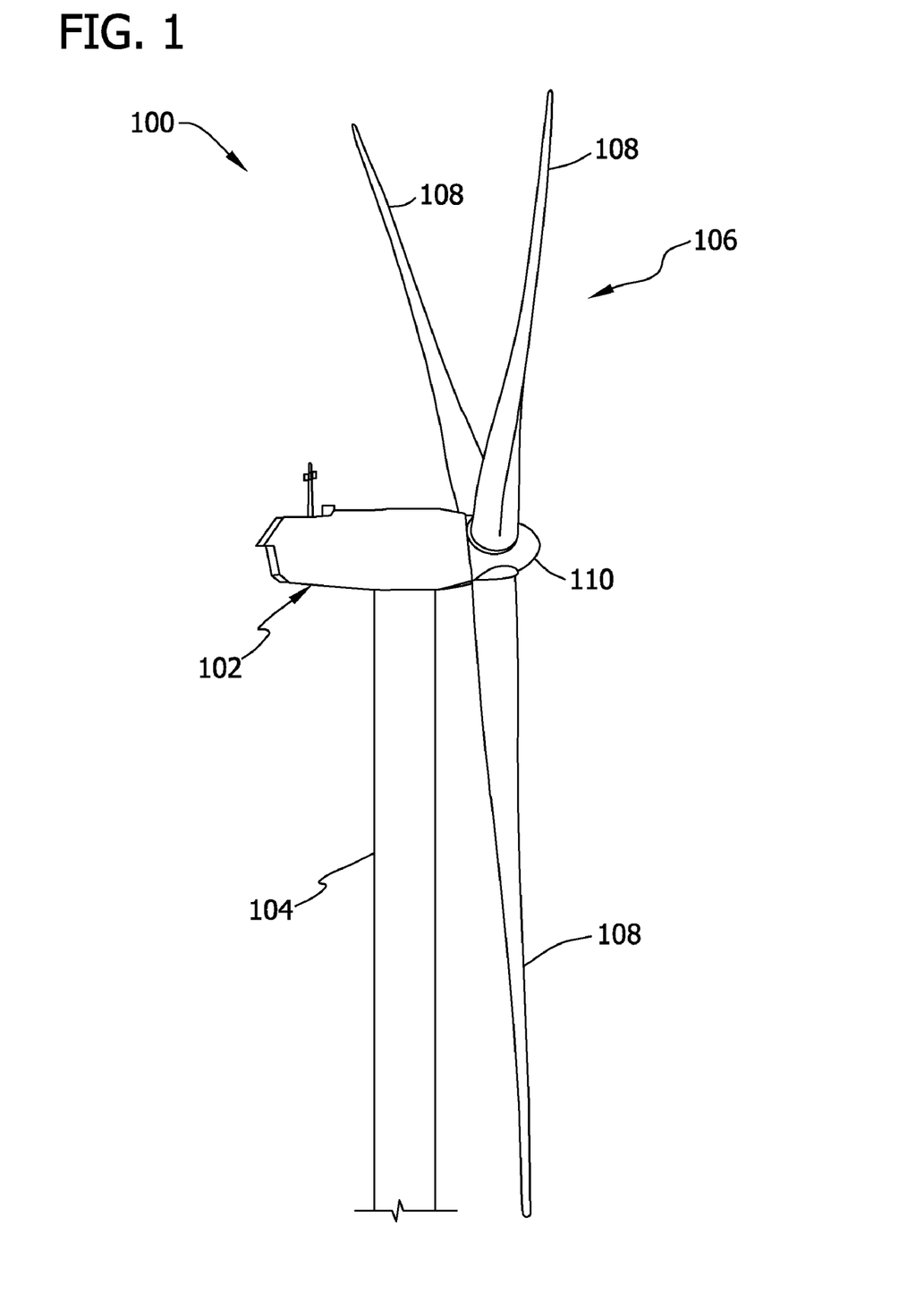
FIG. 1 is a perspective view of an exemplary wind turbine.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is illustrated in FIG. 1). Tower 104 may have any suitable height that facilitates operation of wind turbine 100 as described herein. In the exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In the exemplary embodiment, wind turbine 100 includes a gearbox (not shown) that is rotatingly coupled to rotor 106 and to the generator.

Figure 2:
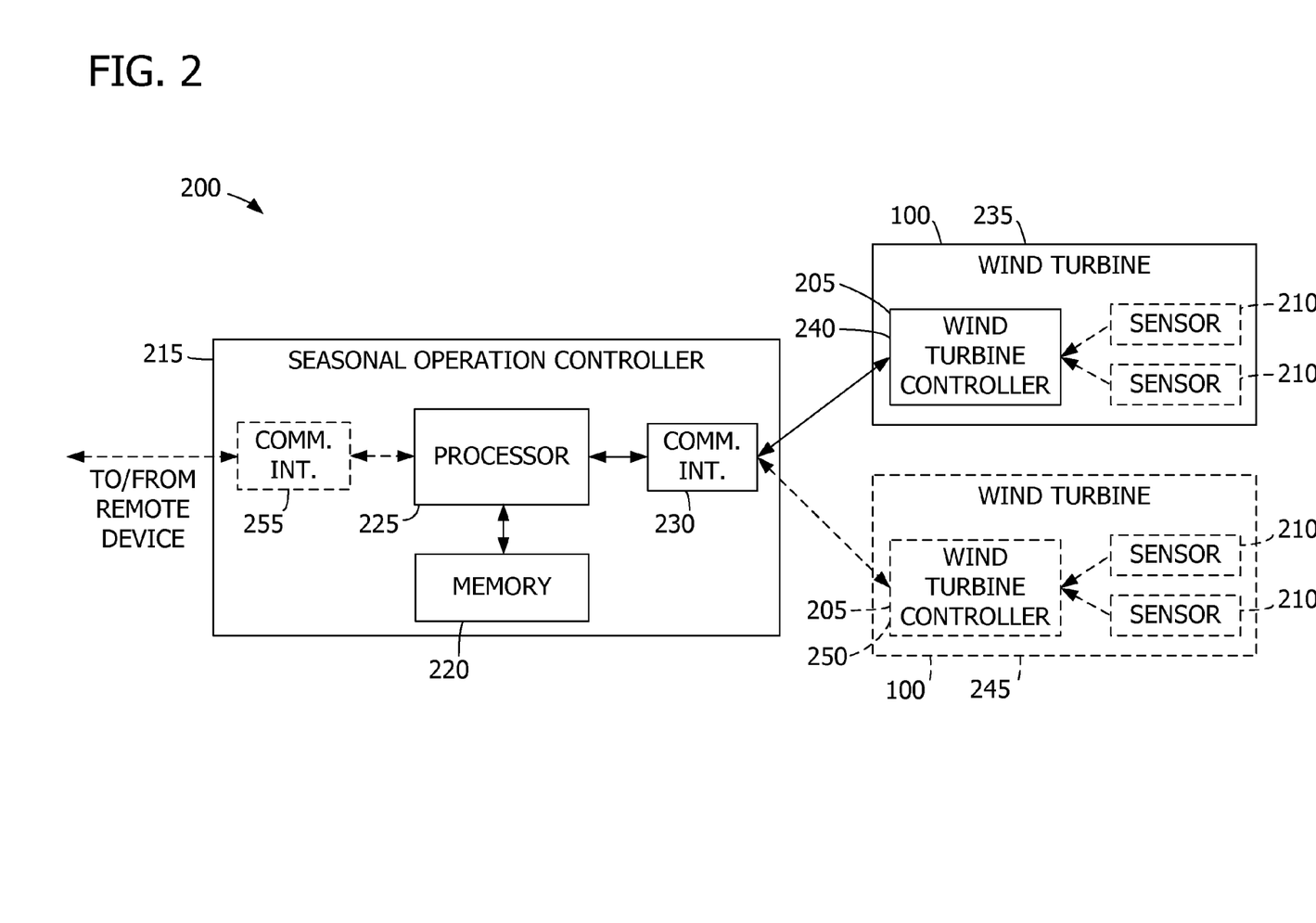
FIG. 2 is a block diagram illustrating an exemplary system for operating one or more wind turbines using seasonal parameters.

FIG. 2 is a block diagram illustrating an exemplary system 200 for operating one or more wind turbines 100 based at least in part on seasonal parameters. In one embodiment, system 200 includes two wind turbines 100, each of which includes a wind turbine controller 205. In one embodiment, wind turbine controller 205 is positioned within corresponding wind turbine 100. For example, wind turbine controller 205 may be positioned on or within nacelle 102 or on or within tower 104 (shown in FIG. 1).

In some embodiments, wind turbine 100 includes one or more sensors 210. Sensors 210 sense or detect one or more wind turbine operating conditions. For example, sensor 210 may be an accelerometer, a vibration sensor (e.g., indicating mechanical vibration of one or more components of wind turbine 100), a power output sensor, a blade pitch sensor, a turbine speed sensor, a gear ratio sensor, an ambient air temperature sensor, a wind speed sensor and/or a wind direction sensor (e.g., an anemometer), an air density sensor, an atmospheric pressure sensor, a humidity sensor, a turbine temperature sensor, a gearbox temperature sensor, a voltage sensor, a current sensor, and/or any sensor suitable for use with wind turbine 100. Each sensor 210 is located with respect to wind turbine 100 according to its function. For example, an air temperature sensor may be positioned on an outside surface of nacelle 102 or tower 104, such that the air temperature sensor is exposed to air surrounding wind turbine 100. Each sensor 210 generates and transmits a signal corresponding to the one or more detected operating conditions. Moreover, each sensor 210 may transmit a signal continuously, periodically, or only once, for example, though other signal timings are also contemplated. Furthermore, each sensor 210 may transmit a signal either in an analog form or in a digital form.

Wind turbine controller 205 is configured to control an operation of corresponding wind turbine 100. System 200 also includes a seasonal operation controller 215, which includes a memory area 220 for storing one or more operating specifications. In one embodiment, each operating specification is associated with a season. Memory area 220 may also include one or more season definitions.

Seasonal operation controller 215 also includes a processor 225 that is programmed to determine a current season. In one embodiment, processor 225 determines the current season based on a current date and a predetermined schedule of seasons. For example, memory area 220 may include an operating specification associated with a cold season and an operating specification associated with a warm season. The predetermined schedule of seasons may indicate that the cold season occupies a first date range (e.g., October 1 through March 31) and that the warm season occupies a second date range (e.g., April 1 through September 30). Processor 225 selects the operating specification associated with the cold season if the current date falls within the first date range. Otherwise, processor 225 selects the operating specification associated with the warm season.

In another embodiment, processor 225 determines a current season based on temperature information. Processor 225 acquires from wind turbine controller 205 a plurality of air temperature readings corresponding to a duration of time. For example, wind turbine 100 may include one or more air temperature sensors 210 from which wind turbine controller 205 receives temperature readings. Processor 225 calculates an average air temperature for the duration based on the air temperature readings. An average may include, for example, a moving average for a time range (e.g., the previous twenty-four hours, the previous forty-eight hours, or the previous seven days).

Processor 225 determines a season based on the average air temperature and at least one predetermined air temperature threshold. For example, a cold season may be defined as a period of time in which an average air temperature is at or below a predetermine air temperature threshold of 45° F., and a warm season may be defined as a period of time in which an average air temperature is above the predetermined air temperature threshold. The number of thresholds defined is equal to the number of seasons minus one. For example, if three seasons are defined (e.g., cold, transitional, and warm), a first predetermined air temperature threshold separates the first season from the second season, and a second predetermined air temperature threshold separates the second season from the third season. The second season is therefore defined as a period of time in which an average air temperature is above the first predetermined air temperature threshold and at or below the second predetermined air temperature threshold.

In yet another embodiment, processor 225 determines a current season based on both a predetermined schedule of seasons and an average air temperature, as described separately above. For example, a first current season decision may be determined based on a predetermined schedule, and a second current season decision may be determined based on an average air temperature. The first decision and the second decision may be assigned a weight (e.g., based on a confidence of the determination for each decision) and combined to create a combined current season decision.

Processor 225 is also programmed to select, from the operating specifications in memory area 220, an operating specification associated with the current season. Seasonal operation controller 215 further includes a communication interface 230 that is communicatively coupled to the wind turbine controller 205 and configured to transmit the selected operating specification to wind turbine controller 205. Wind turbine controller 205 controls the operation of wind turbine 100 based at least in part on the transmitted operating specification.

In some embodiments, system 200 includes multiple wind turbines 100. For example, wind turbine 100 referenced above may be a first wind turbine 235 including a first wind turbine controller 240, and system 200 may include a second wind turbine 245, which includes a second wind turbine controller 250. Processor 225 is further programmed to transmit the selected operating specification to second wind turbine controller 250, and second wind turbine controller 250 controls the operation of second wind turbine 245 based on the transmitted operating specification.

Processor 225 may select the operating specification by selecting a parameter set identifier corresponding to the current season. A parameter set identifier is any name, number, or other value that first wind turbine controller 240 or second wind turbine controller 250 can use to identify an operating parameter set. For example, a parameter set identifier may include, without limitation, a name of a season. In one embodiment, first wind turbine controller 240 controls the operation of first wind turbine 235 based on a first plurality of operating parameter definitions corresponding to the parameter set identifier, and second wind turbine controller 250 controls the operation of second wind turbine 245 based on a second plurality of operating parameter definitions corresponding to the parameter set identifier. Wind turbine controllers 205 may include a plurality of operating parameter sets, each associated with a parameter set identifier and including one or more operating parameter definitions.

In another embodiment, processor 225 selects the operating specification by selecting a first operating parameter set corresponding to first wind turbine 235 and a second operating parameter set corresponding to second wind turbine 245. Communication interface 230 is configured to transmit the operating specification to first wind turbine controller 240 by transmitting the first operating parameter set and to transmit the operating specification to second wind turbine controller 250 by transmitting the second operating parameter set.

Seasonal operation controller 215 may be located proximate to or remote to wind turbine 235 and/or wind turbine 245. For example, seasonal operation controller 215, first wind turbine 235, and second wind turbine 245 may be part of a single wind farm and/or communicatively coupled to a single wind farm network. Alternatively, first wind turbine 235 may be located at a first site (e.g., a first wind farm), and second wind turbine 245 may be located at a second site (e.g., a second wind farm) remote to the first site. Seasonal operation controller 215 may be located at a third site, such as a centralized operation center.

In some embodiments, seasonal operation controller 215 includes a remote device communication interface 255 for communicating with a remote device. Seasonal operation controller 215 may receive a season definition, an operating specification, an operating parameter set, and/or an operating parameter definition via remote device communication interface 255 and store the received data in memory area 220. In addition, or alternatively, seasonal operation controller 215 may determine a current season by receiving a current season identifier via remote device communication interface 255.

Figure 3:
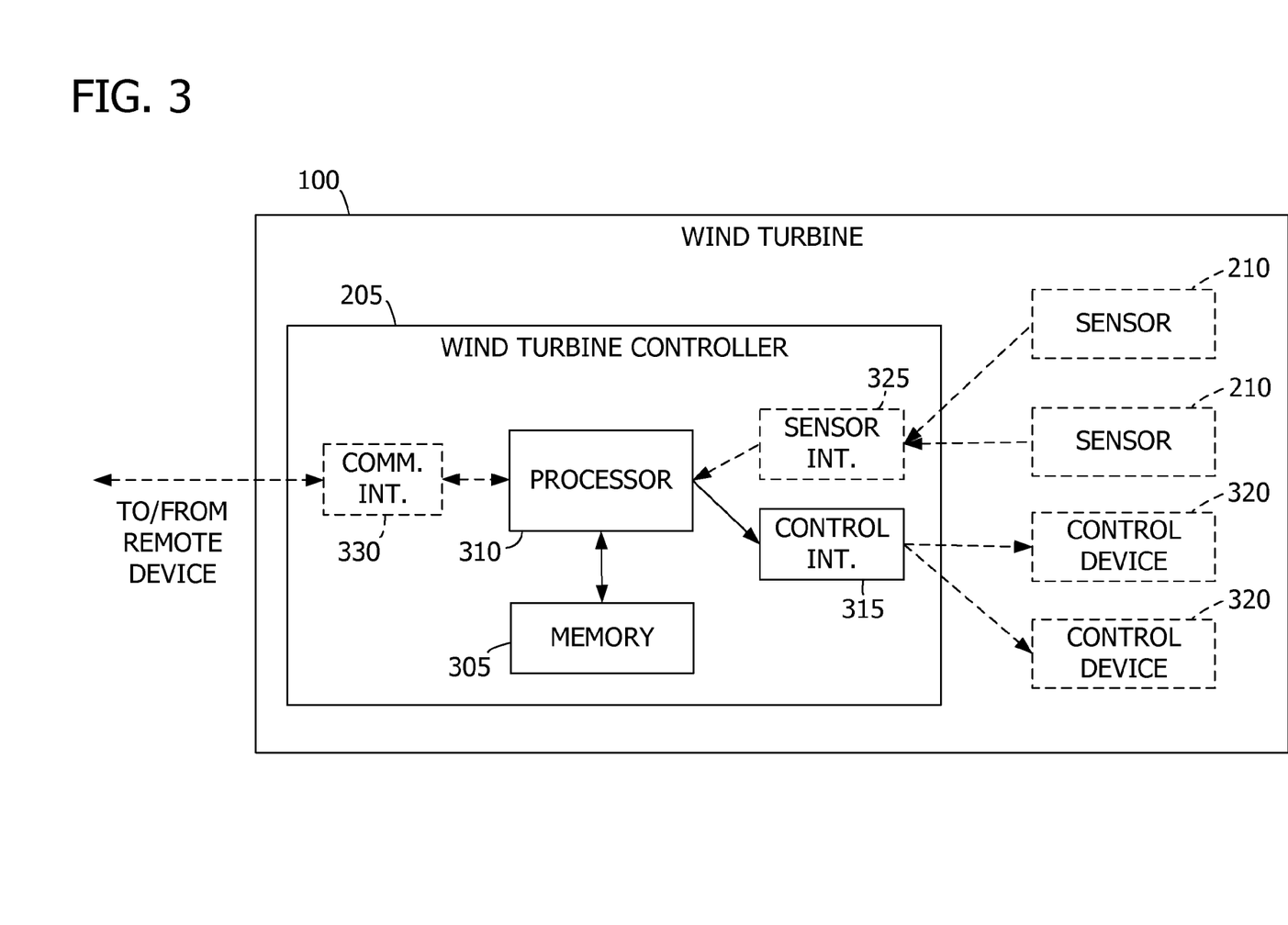
FIG. 3 is a block diagram illustrating an exemplary wind turbine controller.

FIG. 3 is a block diagram illustrating an exemplary wind turbine controller 205 for controlling operation of wind turbine 100 (shown in FIG. 1). Wind turbine controller 205 includes a memory area 305 for storing a plurality of operating specifications. Each operating specification corresponds to a season. Memory area 305 may also include one or more season definitions.

Wind turbine controller 205 also includes a processor 310 programmed to determine a current season and select, from the plurality of operating specifications in memory area 305, an operating specification corresponding to the current season. Wind turbine controller 205 also includes a wind turbine control interface 315 configured to control an operation of wind turbine 100 based at least in part on the selected operating specification. In addition, or alternatively, processor 310 may be programmed to determine a fault condition and/or an alarm condition based on the selected operating specification.

In some embodiments, wind turbine control interface 315 is configured to be operatively coupled to at least one wind turbine control device 320. Wind turbine control device 320 includes, without limitation, a relay, a motor, a brake, and/or a servomechanism. Controlling an operation of wind turbine 100 may include operating wind turbine control device 320. In one embodiment, wind turbine control device 320 is configured to operate a ventilation mechanism based on the operating specification. In another embodiment, wind turbine control device 320 is configured to disable wind turbine 100 by applying a brake in response to a fault condition detected by processor 310 based on the operating specification.

Processor 310 may select the operating specification by selecting an operating parameter set corresponding to the current season. The operating parameter set includes a plurality of operating parameter definitions. An operating parameter definition may define, without limitation defining, an alarm threshold, a fault threshold, a device actuation threshold, a control setpoint, and/or a calculation algorithm identifier.

Processor 310 may determine the current season based on a current date and a predetermined schedule of seasons, as described above with regard to seasonal operation controller 215. In addition, or in the alternative, processor 310 may determine the current season based on a plurality of meteorological readings. For example, wind turbine 100 may include one or more sensors 210, such as meteorological sensors (e.g., air temperature sensors), and wind turbine controller 205 may include a sensor interface 325 for receiving a plurality of meteorological signals and/or meteorological readings from each sensor 210.

In the exemplary embodiment, wind turbine controller 205 is communicatively coupled to sensors 210 via a sensor interface 325. Sensor interface 325 is configured to receive signals transmitted by one or more sensors 210. If wind turbine 100 includes multiple sensors 210, wind turbine controller 205 may include multiple sensor interfaces 325 that are coupled to at least one sensor 210. Alternatively, wind turbine controller 205 may include only one sensor interface 325 that is coupled to a plurality of sensors 210. In one embodiment, wind turbine controller 205 is communicatively coupled to sensors 210 via a sensor monitor (not shown in FIG. 3).

Wind turbine controller 205 may also include a communication interface 330. In one embodiment, communication interface 330 is configured to receive a current season identifier from a remote device. Processor 310 determines the current season based on the received current season identifier. For example, processor 310 may identify within memory area 305 a season definition having an identifier equal to the received current season identifier.

In one embodiment, wind turbine controller 205 receives one or more signals from sensor 210 via sensor interface 325 and processes the signal(s) by processor 310 to create one or more operating condition values. In some embodiments, processor 310 is programmed (e.g., with executable instructions in memory area 305) to sample a signal produced by sensor 210. For example, processor 310 may receive a continuous signal from sensor 210 and, in response, produce an operating condition value based on the continuous signal periodically (e.g., once every five seconds). In some embodiments, processor 310 normalizes a signal received from sensor 210. For example, a temperature sensor may produce an analog signal with a parameter (e.g., voltage) that is directly proportional to a measured temperature. Processor 310 may be programmed to convert the analog signal to a temperature value.

Exemplary operating condition values may include, without limitation, a temperature value, a humidity value, an atmospheric pressure value, a wind speed value, a wind direction value, a vibration value, a gear mesh frequency amplitude value, and/or a shaft speed value. Moreover, processor 310 may be programmed to create an operating condition value based on signals received from multiple sensors 210. For example, wind turbine 100 may include multiple air temperature sensors, and processor 310 may calculate an average air temperature based on temperature values from each air temperature sensor. In some embodiments, controller 205 stores one or more signals and/or operating condition values in memory area 305.

Various connections are available between wind turbine control interface 315 and wind turbine control device 320 and between sensor interface 325 and sensor 210. Such connections include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 100) network connection, whether wired or wireless.

Communication between devices such as seasonal operation controller 215, wind turbine controller 205, and remote devices may occur in a variety of forms. For example, communication interfaces 255, 230, and 330 may use a wired network connection (e.g., Ethernet or an optical fiber), radio frequency (RF), BLUETOOTH, an IEEE 802.11 standard (e.g., 802.11(g) or 802.11(n)), Worldwide Interoperability for Microwave Access (WIMAX), a cellular phone technology (e.g., the Global Standard for Mobile communication (GSM)), and/or any other suitable communication means. Seasonal operation controller 215, wind turbine controller 205, and/or a remote device may include multiple communication interfaces to support additional forms of communication, or multiple forms of communication may be supported by a single communication interface. Devices such as seasonal operation controller 215, wind turbine controller 205, and a remote device may be communicatively coupled directly or indirectly. For example, seasonal operation controller 215 may communicate with wind turbine controller 205 through a network such as a local area network (LAN), a wide area network (WAN), the Internet, or any other network suitable for communicating with wind turbine controller 205.

Figure 4:
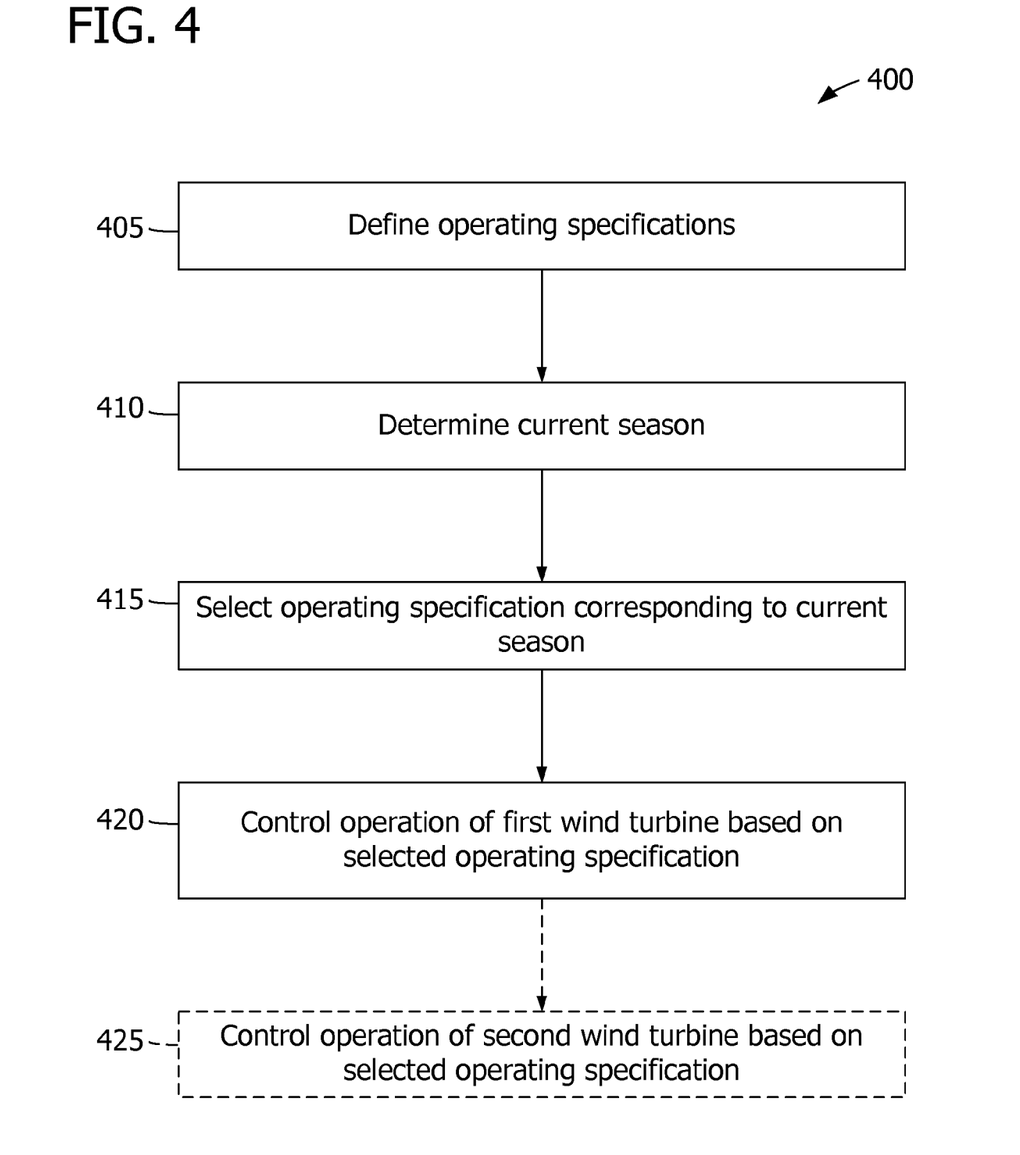
FIG. 4 is a flowchart of an exemplary method for controlling a wind turbine.

FIG. 4 is a flowchart of an exemplary method 400 for controlling a wind turbine, such as wind turbine 100, shown in FIG. 1. Method 400 includes defining 405 one or more operating specifications in a memory area of a computing device. Each operating specification is associated with one or more operating parameter definitions and corresponds to a season. A current season is determined 410 by the computing device. For example, a current season may be based on a current date and a predetermined schedule of seasons. In addition, or alternatively, a current season may be determined 410 by calculating a moving average of at least one meteorological condition based on a plurality of meteorological readings and comparing the moving average of the meteorological condition to at least one meteorological condition threshold value.

An operation specification corresponding to the current season is selected 415 from the memory area. An operation of a wind turbine is controlled 420 based at least in part on the operating parameter definitions associated with the selected operating specification. For example, a fault threshold may be adjusted based on at least one of the operating parameter definitions.

In some embodiments, a plurality of wind turbines is controlled based at least in part on the operating specification. In the exemplary embodiment, an operation of a second wind turbine is controlled 425 based at least in part on the operating specification. For example, each wind turbine may be controlled based on one set of operating parameter definitions, or each wind turbine may be controlled based on a set of operating parameter definitions that corresponds to the wind turbine and is associated with the operating specification.

A current season determination, as described herein, may be performed periodically or upon receipt of a request (e.g., from a remote device, from a wind turbine controller, or from a human operator). For example, the current season may be determined once every seven days, once each day, or once every 12 hours. If a newly determined current season is the same as the previously determined season, no further action may be taken. A current season may be manually input at a controller by a human operator.

The methods described herein may be encoded as executable instructions embodied in a computer readable medium, including a memory area of a computing device. Such instructions, when executed by a processor, cause the processor to perform at least a portion of the methods described herein.

Exemplary embodiments of a wind turbine control system are described above in detail. The monitoring system, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for controlling an operation of a wind turbine, the system comprising:
a wind turbine controller configured to control an operation of the wind turbine; and,
a seasonal operation controller comprising:
a memory area for storing a plurality of operating specifications, each operating specification of the plurality of operating specifications associated with a season;
a processor programmed to:
determine a current season; and,
select, from the plurality of operating specifications in the memory area, an operating specification associated with the current season; and,
a communication interface communicatively coupled to the wind turbine controller and configured to transmit the selected operating specification to the wind turbine controller,
wherein the wind turbine controller controls the operation of the wind turbine based at least in part on the transmitted operating specification.

2. A system in accordance with claim 1, wherein the processor selects the operating specification by selecting a parameter set identifier corresponding to the current season.

3. A system in accordance with claim 1, wherein the wind turbine is a first wind turbine including a first wind turbine controller, the system further comprising a second wind turbine including a second wind turbine controller configured to control an operation of the second wind turbine, wherein the processor is further programmed to transmit the selected operating specification to the second wind turbine controller, and the second wind turbine controller controls the operation of the second wind turbine based at least in part on the transmitted operating specification.

4. A system in accordance with claim 3, wherein:
the processor selects the operating specification by selecting a parameter set identifier corresponding to the current season;
the first wind turbine controller controls the operation of the first wind turbine based at least in part on a first plurality of operating parameter definitions corresponding to the parameter set identifier; and,
the second wind turbine controller controls the operation of the second wind turbine based at least in part on a second plurality of operating parameter definitions corresponding to the parameter set identifier.

5. A system in accordance with claim 2, wherein:
the processor is further programmed to select the operating specification by selecting a first operating parameter set corresponding to the first wind turbine and a second operating parameter set corresponding to the second wind turbine;
the communication interface is configured to transmit the operating specification to the first turbine controller by transmitting the first operating parameter set; and,
the communication interface is configured to transmit the operating specification to the second wind turbine controller by transmitting the second operating parameter set.

6. A system in accordance with claim 2, wherein the first wind turbine is positioned at a first site, the second wind turbine is positioned at a second site, and the seasonal operation controller is positioned at a third site.

7. A system in accordance with claim 1, wherein the processor is further programmed to determine the current season based on a current date and a predetermined schedule of seasons.

8. A system in accordance with claim 1, wherein the processor is further programmed to determine the current season by:
acquiring from the wind turbine controller a plurality of air temperature readings corresponding to a duration of time;
calculating an average air temperature for the duration based on the air temperature readings; and,
determining a season based on the average air temperature and at least one predetermined air temperature threshold.

9. A device for controlling an operation of a wind turbine, the device comprising:
a memory area for storing a plurality of operating specifications, each operating specification of the plurality of operating specifications corresponding to a season;
a processor programmed to:
determine a current season; and,
select, from the plurality of operating specifications in the memory area, an operating specification corresponding to the current season; and,
a wind turbine control interface configured to control an operation of a wind turbine based at least in part on the selected operating specification.

10. A device in accordance with claim 9, wherein the wind turbine control interface comprises a communication interface configured to control the operation of the wind turbine by transmitting the operating specification to a wind turbine controller.

11. A device in accordance with claim 9, wherein the wind turbine control interface is configured to be operatively coupled to at least one wind turbine control device, the at least one wind turbine control device including at least one of the following: a relay, a motor, and a servomechanism.

12. A device in accordance with claim 9, wherein the processor is further programmed to select the operating specification by selecting an operating parameter set corresponding to the current season, the operating parameter set including a plurality of operating parameter definitions.

13. A device in accordance with claim 12, wherein the processor is further programmed to select an operating parameter set including at least one of the following: an alarm threshold, a fault threshold, a device actuation threshold, a control setpoint, and a calculation algorithm identifier.

14. A device in accordance with claim 9, wherein the processor is further programmed to determine the current season based on a current date and a predetermined schedule of seasons.

15. A device in accordance with claim 9, further comprising a sensor interface configured to acquire a plurality of meteorological readings from at least one meteorological sensor, wherein the processor is further programmed to determine the current season based on the plurality of meteorological readings, a current date, and a predetermined schedule of seasons.

16. A device in accordance with claim 9, further comprising a communication interface configured to receive a current season identifier from a remote device, wherein the processor is further programmed to determine the current season based on the received current season identifier.

17. A method for controlling a wind turbine, the method comprising:

defining, in a memory area of a computing device, a plurality of operating specifications, each operating specification of the plurality of operating specifications associated with a plurality of operating parameter definitions and corresponding to a season;

determining, by the computing device, a current season;

selecting, from the memory area, an operating specification of the plurality of operating specifications corresponding to the current season; and, controlling an operation of a wind turbine based at least in part on the plurality of operating parameter definitions associated with the selected operating specification.

18. A method in accordance with claim 17, wherein determining, by the computing device, the current season comprises:

calculating a moving average of at least one meteorological condition based on a plurality of meteorological readings; and, comparing the moving average of the meteorological condition to at least one meteorological condition threshold value.

19. A method in accordance with claim 17, wherein controlling an operation of a wind turbine comprises adjusting a fault threshold based on at least one of the plurality of operating parameter definitions.

20. A method in accordance with claim 17, wherein controlling an operation of a wind turbine comprises controlling an operation of a first wind turbine and an operation of a second wind turbine based at least in part on the plurality of operating parameter definitions associated with the selected operating specification.

* * * * *